Feb. 2, 1954
H. N. WARD
2,667,787
POWER TRANSMISSION UNIT FOR USE
WITH TRACTOR POWER TAKE-OFFS
Filed March 16, 1951
2 Sheets-Sheet 1
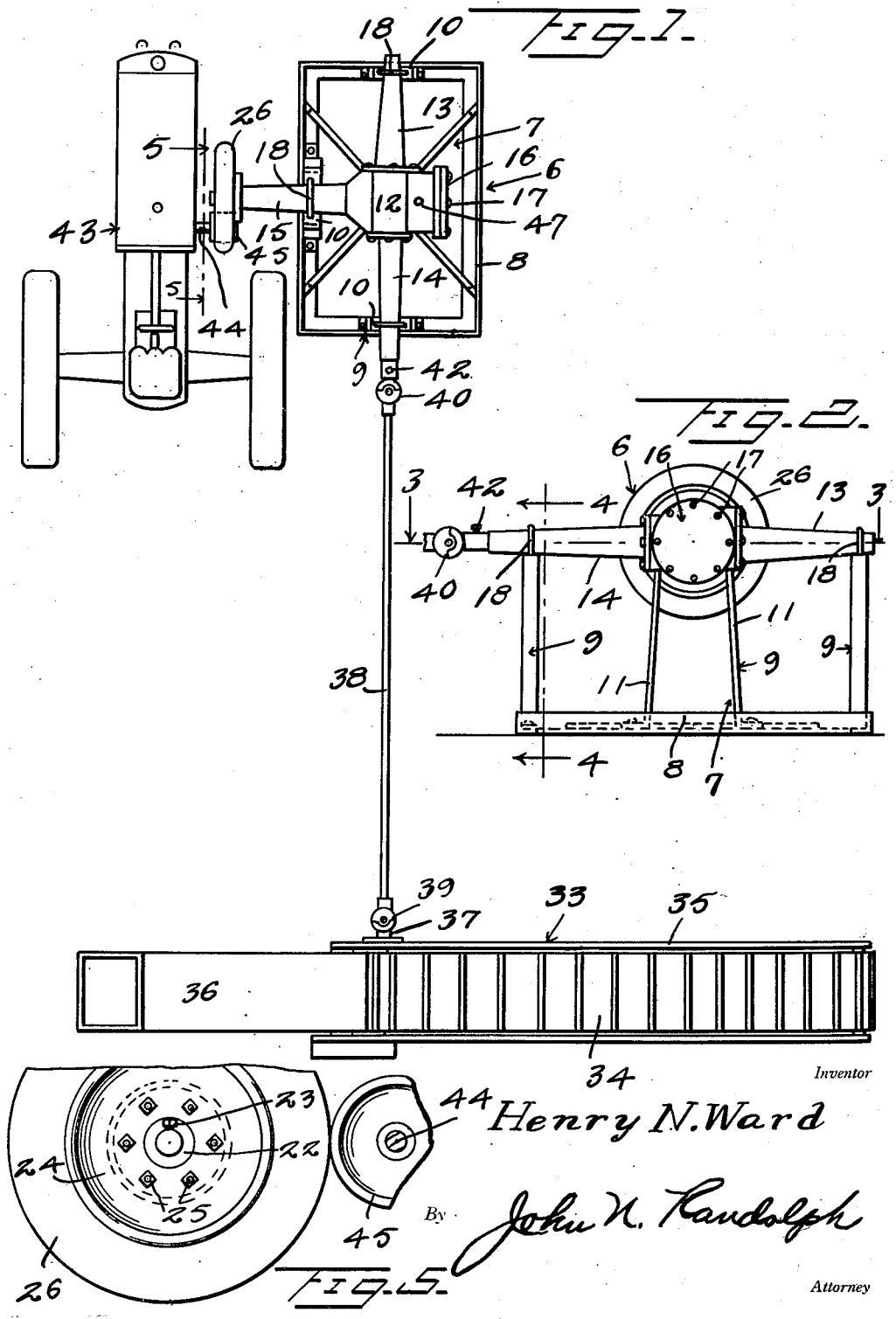
Inventor
Henry N. Ward
By John N. Randolph
Attorney

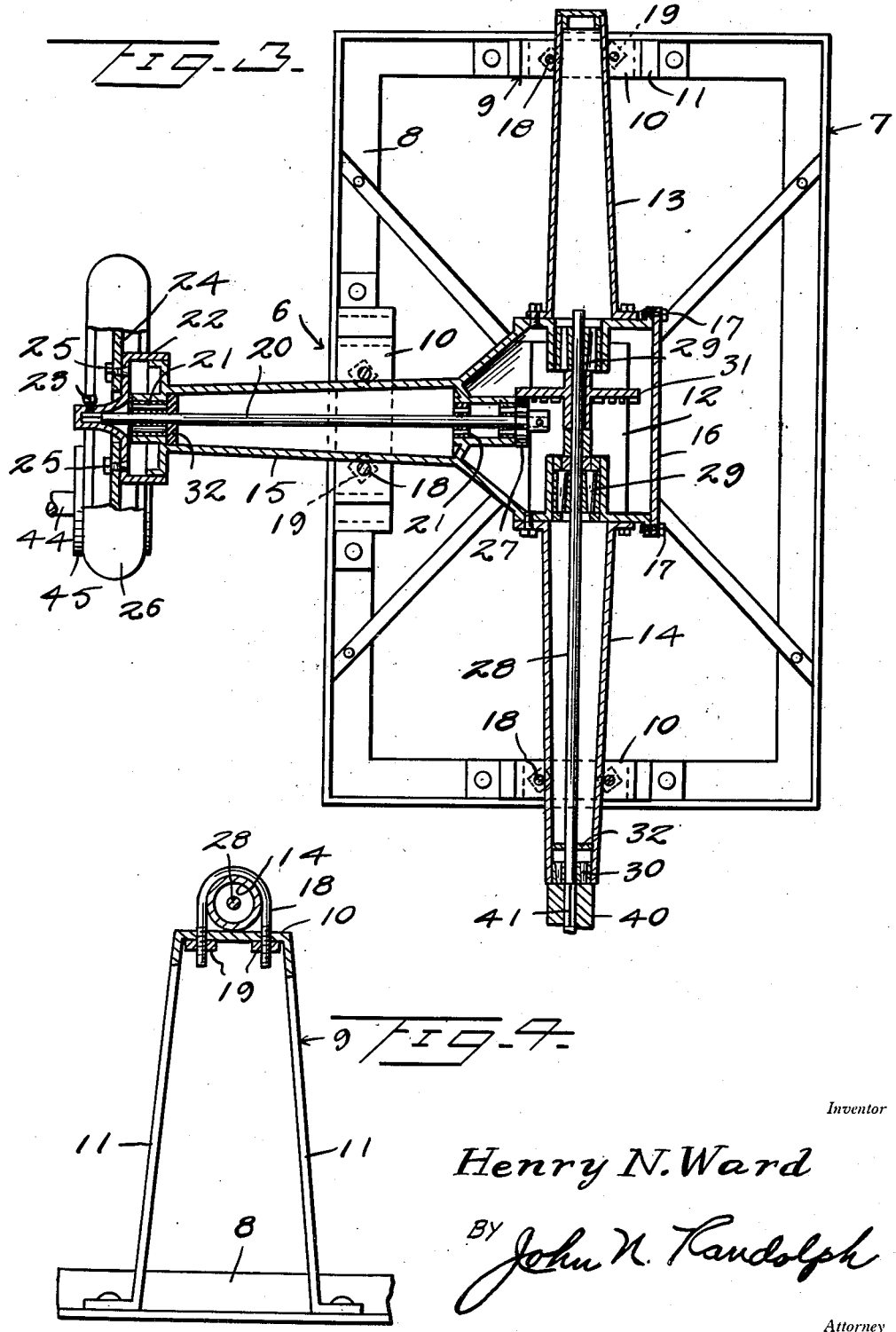

Patented Feb. 2, 1954

2,667,787

UNITED STATES PATENT OFFICE 2,667,787

POWER TRANSMISSION UNIT FOR USE WITH TRACTOR POWER TAKE-OFFS

Henry N. Ward, Klemme, Iowa

Application March 16, 1951, Serial No. 215,943

7 Claims. (Cl. 74—15.8)

This invention relates to a novel power transmitting unit adapted to be driven by a tractor power take-off for driving suitable mechanism as for example a grain elevator and has for its primary object to provide a unit which may be connected to the power take-off shaft of a tractor without the use of belts, gears or the like so that a tractor by being driven up to the unit may be connected thereto for driving the unit and may be similarly disconnected therefrom by merely backing the tractor away from the unit.

A particular advantage of the present invention resides in the fact that the unit will eliminate the need for an extra tractor so that a tractor may be employed for hauling a loaded vehicle, for example, to an elevator and may be utilized while the vehicle is being unloaded for driving an elevator, for example, for conveying the material unloaded from the vehicle or wagon to a crib or other depository.

Still a further object of the invention is to provide a power transmitting unit of extremely simple construction which will effectively function with a pulley of a tractor power take-off shaft for driving the input and output shafts of the transmission unit.

Another object of the invention is to provide a transmission unit of extremely simple construction capable of being very economically manufactured yet which will be extremely efficient and durable for accomplishing its intended purpose.

Various other objects and advantages of the invention will hereinafter become more fully apparent from the following description of the drawings, illustrating a presently preferred embodiment thereof, and wherein:

Figure 1 is a plan view showing the invention in an operative position;

Figure 2 is a side elevational view of the power transmission as it will appear looking from right to left of Figure 1;

Figure 3 is an enlarged horizontal sectional view thereof taken substantially along a plane as indicated by the line 3—3 of Figure 2;

Figure 4 is a vertical sectional view taken substantially along a plane as indicated by the line 4—4 of Figure 2, and Figure 5 is an enlarged fragmentary view taken substantially along a plane as indicated by the line 5—5 of Figure 1 but showing the pulley in a different location relatively to the friction wheel of the power transmission.

Referring more specifically to the drawings, the power transmission unit in its entirety is designated generally 6 and includes a frame, designated generally 7 having a rectangular base 8 which is adapted to rest on the ground and which is provided on three sides thereof with upstanding standards 9 each of which is secured to and rises from the base 8 and each of which preferably includes an upper crosshead portion 10 and a pair of legs 11 extending between the ends of the crosshead 10 and the base 8.

A gear casing 12 is provided with aligned shaft housings 13 and 14 communicating therewith and projecting therefrom and a third shaft housing 15 likewise communicating with and projecting from the gear casing 12 and disposed at a right angle to the axis of the shaft housings 13 and 14. The other side of the gear casing 12 is provided with a removable closure 16 which is secured thereto by threaded fastenings 17, as best seen in Figure 3. The three shaft housings 13, 14 and 15 rest upon the three crossheads 10, constituting parts of the frame 8 and are secured detachably thereto by U-bolts 18, as best illustrated in Figure 4, each of which engages over its associated shaft housing and has its threaded end extending downwardly through openings in the crosshead 10 disposed thereberneath. Nuts 19 engage the threaded ends of each U-bolt 18 and are tightened to bear against the underside of the crossheads 10 for securing the shaft housings to the standards 9 and for thereby supporting the gear casing on the frame 8.

An input shaft 20 extends longitudinally through the shaft housing 15 and is journaled near its ends by anti-friction bearings 21 of the shaft housing 15. The outer end of the shaft 20 is keyed to the central portion of a wheel hub 22 and is detachably secured to said wheel hub by a setscrew 23. A wheel 24, such as a conventional automobile wheel, is secured by conventional fastenings 25 to the wheel hub 22 and has a conventional pneumatic tire 26 mounted on the rim of said wheel 24. A pinion 27 is fixed to the opposite, inner end of the shaft 20 and is disposed in the gear casing 12.

An output shaft 28 extends through the shaft housing 14, through the gear case 12, beyond the inner end of the input shaft 20 and may extend into the shaft housing 13. The shaft 28 is journaled by anti-friction bearing means 29 within the gear case 12 and is also journaled by anti-friction bearing means 30 adjacent the outer end of the shaft housing 14. A crown gear 31 is fixed to the shaft 28 between the bearings 29 and within the gear case 12 and is disposed with its teeth in meshing engagement with the pinion 27. The shaft housings 14 and 15 may be provided with oil seals 32 adjacent their outer ends and around the shafts 20 and 28 respectively.

The frame 7 and parts supported thereby are sufficiently heavy to maintain a position in which the power transmission is disposed yet said parts are sufficiently portable to enable the power transmission to be moved by a suitable conveying vehicle to any desired position in which it is to be used. It will likewise be readily apparent that the base 8 may be readily staked down in any desired location and ordinarily one stake is sufficient to retain it in a desired position.

For the purpose of illustrating one preferred application and use of the power transmission unit 6, a conventional type of elevator, designated generally 33, has been illustrated in Figure 1 including an endless inclined conveyor 34 having an upwardly moving upper flight which travels from left to right of Figure 1 in the elevator frame 35. A hopper or chute 36 is swingably connected at its lower end to the elevator frame 35 so as to discharge onto the upper flight of the endless conveyor 34 adjacent the lower end thereof. The lower driving pulley, not shown, of the endless conveyor 34 is fixed to a shaft 37 which projects laterally from the elevator frame 35. A shaft 38 is connected by a universal joint 39 to said laterally projecting end of the shaft 37 and has a universal joint 40 at its opposite end which is keyed to the non-circular outer end 41 of the output shaft 28, which projects from the outer end of the housing 14. The universal joint 40 is detachably secured to the shaft end 41 by a setscrew 42.

A conventional tractor as illustrated in Figure 1 and designated generally 43 is shown provided with a power take-off shaft 44 projecting laterally therefrom and to which is fixed a conventional belt pulley 45.

Ordinarily, for driving an elevator 33 or other analogous mechanism a power transmitting unit is employed with the tractor power take-off shaft usually driven by a belt drive. With such arrangements it is either necessary to have a separate tractor for hauling the load to the elevator or else considerable time is lost in connecting the power take-off shaft to a power transmitting mechanism. However, with the present invention the tractor 43 may be utilized for pulling a wagon or other trailer vehicle, not shown, loaded with a material to be conveyed by the elevator, as for example corn, to a position where the load may be discharged into the chute or hopper 36. The tractor 43 is then simply uncoupled from the wagon or trailer vehicle and moved forwardly to its position of Figure 1 with the belt pulley 45 thereof in frictional engagement with the tire 26. The tractor power take-off shaft 44 is then driven in a correct direction so that its belt pulley 45 will drive the wheel 24 and tire 26 for driving the geared input shaft 20 and output shaft 28 in correct directions for driving the shafts 37 and 38 so that the endless conveyor 34 of the elevator 33 will be driven in a direction to cause its upper flight to travel upwardly or from left to right of Figure 1 so that the material discharged from the chute or hopper 36 will be conveyed upwardly and discharged from the upper end of the elevator 33 into a crib or other depository. After the wagon or vehicle has been unloaded the tractor 43 is backed out of engagement with the power transmitting unit 6 and recoupled to the wagon so that it can be pulled back to a position to be reloaded and then returned to repeat the operation previously described. As it will be readily apparent from Figure 2, the tire or friction wheel 26 is disposed substantially above the ground level on which the base 8 rests. Power take-off shafts of different tractors may be disposed at different levels above the ground; however, this will not affect the use of the power transmitting unit 6 therewith as the belt pulley 45 on the power take-off shaft may engage the tire 26 below the level of the shaft 20, as illustrated in Figures 1 and 3, or the power take-off shaft may be disposed at the same level as the shaft 20, as illustrated in Figure 5 or the belt pulley 45 may engage the tire 26 above the level of the input shaft 20. By engaging the tire 26 below the level of the input shaft 20 the belt pulley 45 tends to exert an upward lifting action on the wheel 24 but the unit 6 is of sufficient weight to hold it against this lifting action, especially when the base 8 is staked down, so that a good frictional engagement will exist between the tire and belt pulley to avoid slippage. Additionally, the tire 26 may be only partially inflated to afford a maximum gripping engagement of the tire with the belt pulley. The gears and shafts are lubricated through a lubricating port in the gear case 12 normally closed by a plug 47.

Various modifications and changes are contemplated and may obviously be resorted to, without departing from the spirit or scope of the invention as hereinafter defined by the appended claims.

I claim as my invention:

1. The combination with a self propelled vehicle having a power take-off shaft extending outwardly therefrom and a pulley mounted thereon outwardly with respect to an adjacent portion of the vehicle, of a power transmitting unit comprising a frame structure having a base adapted to rest upon the ground, bearing means supported by said frame structure in an elevated position relatively to the base, an input shaft journaled in said bearing means, a friction wheel fixed to one end of said input shaft and rotatably supported thereby in an elevated position and in substantially a vertical plane, said pulley being movable with the vehicle in one direction to position the pulley in frictional engagement with the friction wheel for revolving the friction wheel and input shaft, an output shaft journaled in said bearing means having one end adapted to be connected to a mechanism to be driven by the power transmitting unit, and means forming a driving connection between the opposite, adjacent ends of the input shaft and output shaft.

2. A power transmitting unit as in claim 1, said friction wheel including an inflated pneumatic tire adapted to be engaged by the pulley of the power take-off shaft.

3. A power transmitting unit as in claim 1, said friction wheel being spaced outwardly from an adjacent side of the frame structure whereby the vehicle is driven into a position to engage the power take-off shaft pulley with the friction wheel and disengaged therefrom by reversing the direction of travel of the vehicle.

4. A power transmitting unit as in claim 1, said friction wheel being spaced outwardly from an adjacent side of the frame structure whereby the vehicle is driven into a position to engage the power take-off shaft pulley with the friction wheel and disengaged therefrom by reversing the direction of travel of the vehicle, said friction wheel being supported substantially above the level of the base whereby the friction wheel may engage power take-off shaft pulleys disposed at various levels relatively to the level of the input shaft.

5. The combination with a vehicle having a power take-off shaft extending laterally therefrom and a pulley fixed to said shaft, of a frame including an elongated base adapted to rest on the ground, bearing means supported in an elevated position by the frame, an input shaft journalled in the bearing means, a friction wheel fixed to the input shaft and rotatably supported thereby in an elevated position and in substantially a vertical plane outwardly of one side of the frame, said vehicle being movable in a direction parallel to the frame to position the power take-off shaft pulley in engagement with the friction wheel for driving the input shaft, and an output shaft journalled in the bearing means and connected to and driven by the input shaft.

6. A power transmission unit as in claim 5, the axis of the friction wheel being disposed above the level of the axis of the pulley whereby the friction wheel is disposed over a portion of the pulley when in engagement therewith so that the weight of the frame structure will insure proper frictional contact between the pulley and friction wheel.

7. A power transmission unit as in claim 5, and a pneumatic tire mounted on said friction wheel and forming the peripheral portion thereof which engages the pulley.

HENRY N. WARD.

References Cited in the file of this patent

UNITED STATES PATENTS

| Number | Name | Date |
|---|---|---|
| 1,161,982 | Scheidler | Nov. 30, 1915 |
| 1,176,768 | McHugh | Mar. 28, 1916 |
| 1,225,490 | Rafferty | May 8, 1917 |
| 1,488,976 | Cayford | Apr. 1, 1924 |
| 1,559,975 | Murray | Nov. 3, 1925 |
| 1,755,287 | Donavan | Apr. 22, 1930 |
| 1,792,143 | Cizek | Feb. 10, 1931 |
| 1,801,744 | Hile et al. | Apr. 21, 1931 |
| 2,211,413 | Ford | Aug. 13, 1940 |